US010725181B2

(12) United States Patent
Chen et al.

(10) Patent No.: US 10,725,181 B2
(45) Date of Patent: Jul. 28, 2020

(54) IN-BAND PSEUDOLITE WIRELESS POSITIONING METHOD, SYSTEM AND DEVICE

(71) Applicant: ZTE CORPORATION, Guangdong (CN)

(72) Inventors: Shijun Chen, Guangdong (CN); Liujun Hu, Guangdong (CN); Guanghui Yu, Guangdong (CN); Haitao Lu, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 634 days.

(21) Appl. No.: 15/102,114

(22) PCT Filed: May 21, 2014

(86) PCT No.: PCT/CN2014/078039
§ 371 (c)(1),
(2) Date: Jun. 6, 2016

(87) PCT Pub. No.: WO2014/183691
PCT Pub. Date: Nov. 20, 2014

(65) Prior Publication Data
US 2016/0313448 A1    Oct. 27, 2016

(30) Foreign Application Priority Data
Dec. 4, 2013    (CN) .......................... 2013 1 0652117

(51) Int. Cl.
*G01S 19/11*    (2010.01)
*G01S 1/02*    (2010.01)
*H04W 64/00*    (2009.01)

(52) U.S. Cl.
CPC ................. *G01S 19/11* (2013.01); *G01S 1/02* (2013.01); *G01S 1/024* (2013.01); *H04W 64/00* (2013.01)

(58) Field of Classification Search
CPC ........ G01S 19/11; G01S 5/0226; G01S 1/025; H04W 64/00
See application file for complete search history.

(56) References Cited

U.S. PATENT DOCUMENTS 5,056,106 A * 10/1991 Wang ..................... A63B 57/00
                                                    375/130
5,311,194 A * 5/1994 Brown .................... G01S 19/11
                                                    342/357.24

(Continued)

FOREIGN PATENT DOCUMENTS

CN    101221233 A    7/2008
CN    101430373 A    5/2009

OTHER PUBLICATIONS

Supplementary Partial European Search Report issued in Application No. EP 14 79 7248 dated Feb. 14, 2017.

*Primary Examiner* — Gregory C. Issing
(74) *Attorney, Agent, or Firm* — Li & Cai Intellectual Property (USA) Office

(57) ABSTRACT

An in-band pseudolite wireless positioning method, system and device are provided. The system has a base station, a pseudolite and a terminal. The base station transmits identifier information to the pseudolite after correcting a transmission clock of the pseudolite and transmits a pseudolite array and positioning correction information to the terminal. The pseudolite generates a random positioning signal sequence according to the identifier information and transmits a positioning signal according to the transmission clock and the random positioning signal sequence. The terminal generates a random positioning signal sequence of the (Continued)

pseudolite according to the pseudolite array and the positioning correction information. The terminal further matches the received positioning signal according to the random positioning signal sequence to obtain the arrival time of the positioning signal and obtain through calculation the position coordinates of the terminal according to the position coordinates of the pseudolite and the arrival time.

5 Claims, 3 Drawing Sheets

(56) References Cited

U.S. PATENT DOCUMENTS

| | | | | |
|---|---|---|---|---|
| 5,646,630 A * | 7/1997 | Sheynblat | ............... | G01S 19/07 342/357.31 |
| 6,002,362 A | 12/1999 | Gudat | | |
| 6,121,928 A * | 9/2000 | Sheynblat | ............... | G01S 19/07 342/357.42 |
| 6,271,788 B1 * | 8/2001 | Longaker | ............... | G01S 19/07 342/357.31 |
| 6,564,064 B1 * | 5/2003 | Ciganer | ................. | G01S 19/11 455/456.1 |
| 7,251,562 B1 * | 7/2007 | Brodie | ................. | G01C 21/206 342/357.75 |
| 7,292,188 B2 * | 11/2007 | Rowitch | ................. | G01S 19/11 342/386 |
| 7,590,383 B2 * | 9/2009 | Dean | ................... | H04L 12/2854 370/315 |
| 7,616,682 B2 * | 11/2009 | Small | ........................ | G01S 1/24 342/352 |
| 8,068,056 B2 * | 11/2011 | Wachter | .................. | H04W 4/02 342/451 |
| 2003/0008669 A1 * | 1/2003 | Stein | ..................... | H04W 64/00 455/456.1 |
| 2005/0015198 A1 * | 1/2005 | Kee | ........................... | G01S 1/20 701/408 |
| 2005/0086001 A1 * | 4/2005 | Kim | ........................ | G01S 19/11 701/469 |
| 2008/0272960 A1 | 11/2008 | Kishimoto et al. | | |
| 2011/0074628 A1 | 3/2011 | Morrison et al. | | |
| 2013/0009815 A1 | 1/2013 | Monnerat | | |

* cited by examiner

IN-BAND PSEUDOLITE WIRELESS POSITIONING METHOD, SYSTEM AND DEVICE

CROSS-REFERENCE TO RELATED APPLICATION

This application is the 371 application of PCT Application No. PCT/CN2014/078039, filed May 21, 2014, which is based upon and claims priority to Chinese Patent Application No. 201310652117.3, filed Dec. 4, 2013, the entire contents of which are incorporated herein by reference.

TECHNICAL FIELD

The disclosure relates to field of mobile communications, in particularly, to a method of wireless positioning using an in-band pseudolite, as well as a system and a device thereof.

BACKGROUND

With development of mobile communications, more and more attention has been paid to positioning technology of mobile phones. As limitation exists in both GPS (Global Positioning System) positioning and other positioning manners using wireless sensor network or the like, a future direction of improvement lies in integrated positioning (multimode positioning) through cooperation of multiple positioning systems so as to achieve a better accuracy of positioning. In this way, advantages of various positioning systems can be exploited, such that a better accuracy and a quick response as well as a relatively broad cover range can be enabled to realize ubiquitous and accurate positioning. For example, the GPS may be combined with the mobile communication system for positioning of a mobile phone. When the GPS is in use, it is required to search out at least four satellites before completion of positioning by solving equations. In indoor condition at crowd urban area, however, the requirement of searching out four satellites may be not satisfied due to serious attenuation of GPS signal, such that GPS positioning cannot be performed and the positioning function may be restricted.

In view of above, a pseudolite solution based on navigation satellites has been proposed to improve indoor positioning. Such solution is implemented by setting pseudolites similar to navigation satellites, which are able to transmit same signal as that of the navigation satellites, at low altitude. As the pseudolites are close to ground, it is possible to achieve a great strength of signal and low attenuation, such that indoor coverage of signal can be extended efficiently. But on the other hand of the solution, it is required for a receiver to process signal dynamic range for both the navigation satellites and the pseudolites as well as to overcome signal interference therebetween, and an additional wireless system is required.

SUMMARY

In view of above, there are provided by the disclosure a method of wireless positioning using an in-band pseudolite, as well as a system and a device thereof.

A system of wireless positioning using an in-band pseudolite provided by the disclosure includes a base station, the pseudolite and a terminal; wherein the base station is configured to transmit identifier information to the pseudolite after correcting a transmission clock of the pseudolite managed by the base station, and transmit a pseudolite array and positioning correction information to the terminal;

the pseudolite is configured to generate a random positioning signal sequence based on the identifier information, and transmit positioning signal, according to the transmission clock and the random positioning signal sequence, via a positioning link having a same frequency band as a wireless system of the base station; and the terminal is configured to generate another random positioning signal sequence of the pseudolite based on the pseudolite array and the positioning correction information, perform a match on the received positioning signal according to the another random positioning signal sequence of the pseudolite to determine an arrival time of the positioning signal, and obtain a position coordinate of the terminal through a calculation based on a given position coordinate of the pseudolite and the arrival time of the positioning signal.

In an embodiment, the pseudolite is further configured to, after completion of a synchronization, transmit synchronization signal via a synchronization link for another un-positioned pseudolite;

downlink signal of the synchronization link includes only the positioning signal; and the transmission of the synchronization signal includes: transmitting the synchronization signal via a wired connection or a wireless connection.

A base station provided by the disclosure includes a synchronization module and a positioning management module, wherein the positioning management module is configured to transmit identifier information to multiple pseudolites and transmit a pseudolite array and positioning correction information to a terminal; and the synchronization module is configured to transmit synchronization signal via a synchronization link, measure a clock difference between the base station and an in-band pseudolite, and correct transmission clocks of the multiple pseudolites managed by the base station.

In an embodiment, the base station further includes a clock module configured to provide the synchronization module with a synchronization clock; and accordingly, the synchronization module is further configured to generate synchronization information based on the synchronization clock provided by the clock module, measure the clock difference between the base station and one or more of the multiple pseudolites managed thereby through the synchronization information, and correct transmission clocks of the one or more of the multiple pseudolites managed by the base station according to the clock difference;

wherein the identifier information includes an identity (ID) of the base station and a pseudolite ID for a pseudolite corresponding thereto;

the clock difference includes a time difference between a transmission timepoint of the synchronization signal from the base station and a reception timepoint of the synchronization signal at the pseudolite.

In an embodiment, the positioning management module is further configured to determine whether the terminal managed by the base station supports function of pseudolite positioning and, if yes, transmit the pseudolite array and the positioning correction information. Otherwise, the process ends.

In an embodiment, the synchronization link includes enabling visibility condition to be maintained during network construction. Otherwise, if the visibility condition cannot be maintained, synchronization may be performed with pseudolites which have been already synchronized such that visibility condition can be met with at least one of those pseudolites.

In an embodiment, the synchronization module is further configured to transmit measurement signal to a pseudolite based on a reference clock, receive response signal from the pseudolite, calculate a clock difference between the base station and the pseudolite, and transmit the clock difference to the pseudolite.

In an embodiment, the positioning management module is further configured to transmit the base station ID and the pseudolite ID to a positioning signal transmission module of a corresponding pseudolite and transmit the pseudolite array as well as space coordinates of the corresponding pseudolite and the base station to a positioning module of the terminal to be positioned.

A pseudolite provided by the disclosure includes a synchronization module, a positioning signal transmission module and a clock module, wherein
the synchronization module is configured to control the clock module;
the positioning signal transmission module is configured to generate a random positioning signal sequence based on identifier information sent from a base station and transmit positioning signal according to a transmission clock and the random positioning signal sequence; and
the clock module is configure to perform a synchronization of the transmission clock under control of the synchronization module.

In an embodiment, the random positioning signal sequence includes, but is not limited to, a random factor, the random factor including a base station ID and a pseudolite ID; and the random positioning signal sequence has a sequence length defined by a protocol.

In an embodiment, the synchronization module is further configured to receive synchronization measurement signal from the base station and reply with a response; and receive a clock difference between a reference clock of the base station and the pseudolite as a clock correction; and
accordingly, the clock module is further configured to correct the transmission clock of the pseudolite based on the clock correction from the synchronization module.

In an embodiment, the positioning signal transmission module is further configured to transmit the positioning signal at a preset time with preset frequency source based on the transmission clock.

In an embodiment, the positioning signal transmission module is further configured to transmit the positioning signal without any other downlink signal; or
the positioning signal transmission module is configured to transmit uplink signal for communication with the base station when management is performed with the base station via a wireless link.

A terminal provided by the disclosure includes a positioning signal reception module, a positioning signal match module and a positioning module, wherein
the positioning signal reception module is configured to receive positioning signal;
the positioning signal match module is configured to generate a random positioning signal sequence of a pseudolite based on received pseudolite array and positioning correction information, perform a match on the received positioning signal according to the random positioning signal sequence of the pseudolite to determine an arrival time of the positioning signal; and the positioning module is configured to obtain a position coordinate of the terminal through a calculation based on a given position coordinate of the pseudolite and the arrival time of the positioning signal.

In an embodiment, the positioning signal match module is further configured to establish a calculation equation of the position coordinate based on the given position coordinate of the pseudolite and the arrival time of the positioning signal, and obtain the position coordinate of the terminal and a clock difference between the terminal and a corresponding base station through the calculation equation.

In an embodiment, the positioning signal reception module is further configured to receive space coordinates of the base station and respective pseudolite, and the pseudolite array to be detected; and receive the positioning signal from respective in-band pseudolite.

In an embodiment, the positioning signal match module is further configured to generate the random positioning signal sequence of the respective pseudolite based on received base station ID and the received pseudolite array, perform correlation match on the received positioning signal, and determine an arrival time of an earliest arrival among positioning signal from the respective pseudolite.

In an embodiment, the positioning module is further configured to establish a distance equation based on the given position coordinate of the pseudolite and a distance between the terminal and the pseudolite, and obtain the position coordinate of the terminal by solving the distance equation.

In an embodiment, the positioning signal match module is further configured to negotiate with the base station via a signaling process and transmit a token, indicative of whether the terminal supports function of pseudolite positioning, to the base station.

A method of wireless positioning using an in-band pseudolite provided by the disclosure includes:
transmitting by a base station identifier information to a pseudolite managed by the base station after correcting a transmission clock of the pseudolite;
generating by the pseudolite a random positioning signal sequence based on the identifier information, and transmitting positioning signal according to the transmission clock and the random positioning signal sequence;
transmitting by the base station a pseudolite array and positioning correction information to a terminal;
generating by the terminal another random positioning signal sequence of the pseudolite based on the pseudolite array and the positioning correction information sent from the base station;
performing by the terminal a match on the received positioning signal according to the another random positioning signal sequence of the pseudolite to determine an arrival time of the positioning signal; and
obtaining by the terminal a position coordinate of the terminal through a calculation based on a given position coordinate of the pseudolite and the arrival time of the positioning signal.

A method of wireless positioning using an in-band pseudolite provided by the disclosure includes:
transmitting by a base station identifier information after correcting a transmission clock of a pseudolite managed by the base station; and
transmitting by the base station a pseudolite array and positioning correction information.

In an embodiment, the correcting by the base station a transmission clock of a pseudolite managed by the same includes:

measuring a clock difference between the base station and one or more pseudolites managed by the base station based on synchronization information; and correcting the transmission clock of the one or more pseudolites managed by the base station according to the clock difference;

the identifier information includes an identification ID of the base station and a pseudolite ID for a pseudolite corresponding to the pseudolite ID.

In an embodiment, the transmitting by the base station a pseudolite array and positioning correction information includes: determining by the base station whether a terminal managed by the same supports function of pseudolite positioning and, if yes, transmitting by the base station the pseudolite array and positioning correction information. Otherwise, the process ends.

A method of wireless positioning using an in-band pseudolite provided by the disclosure includes:

generating by a pseudolite a random positioning signal sequence based on identifier information and transmitting positioning signal according to a transmission clock and the random positioning signal sequence.

In an embodiment, the random positioning signal sequence includes a random factor, the random factor including a base station ID and a pseudolite ID; and the random positioning signal sequence has a sequence length defined by a protocol.

A method of wireless positioning using an in-band pseudolite provided by the disclosure includes:

generating by a terminal a random positioning signal sequence of a pseudolite based on a pseudolite array and positioning correction information;

performing by the terminal a match on received positioning signal according to the random positioning signal sequence of the pseudolite to determine an arrival time of the positioning signal; and obtaining by the terminal a position coordinate of the terminal through a calculation based on a given position coordinate of the pseudolite and the arrival time of the positioning signal.

In an embodiment, the obtaining a position coordinate of the terminal through a calculation includes:

establishing a calculation equation of the position coordinate based on the given position coordinate of the pseudolite and the arrival time of the positioning signal; and obtaining the position coordinate of the terminal and a clock difference between the terminal and a corresponding base station through the calculation equation.

According to the method, system and device of wireless positioning using an in-band pseudolite provided by embodiments of the disclosure, identifier information is transmitted by the base station to a pseudolite after correcting a transmission clock of the pseudolite managed by the same; a random positioning signal sequence is then generated by the pseudolite based on the identifier information, and positioning signal is transmitted according to the transmission clock and the random positioning signal sequence; corresponding random positioning signal sequence of the pseudolite is thus generated by the terminal based on a pseudolite array and the positioning correction information sent from the base station, a match is then performed on the received positioning signal according to the corresponding random positioning signal sequence of the pseudolite to determine an arrival time of the positioning signal, such that a position coordinate of the terminal can be obtained through a calculation based on a given position coordinate of the pseudolite and the arrival time of the positioning signal. In this way, positioning accuracy utilizing cellular network can be improved without aggravating data interference of downlink signal. Furthermore, requirement of wireless bandwidth can be reduced due to usage of the same wireless bandwidth as the cellular network. In addition, more accurate positioning can be provided for those scenarios with limited positioning manners owing to flexible installation of the pseudolite.

DETAILED DESCRIPTION

The disclosure will be described in further detail with reference to the drawings and embodiments hereinbelow.

First Embodiment

Figure 1:
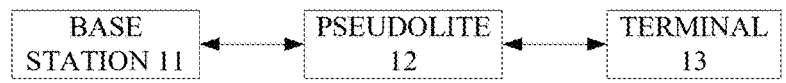
FIG. 1 is a first block diagram illustrating a system of wireless positioning using an in-band pseudolite according to an embodiment of the disclosure.

The system of wireless positioning using an in-band pseudolite according to an embodiment of the disclosure, as shown in FIG. 1, includes: a base station 11, a pseudolite 12, and a terminal 13.

In an embodiment, the base station 11 is configured to transmit identifier information to a plurality of the pseudolites 12 after correcting transmission clocks of the pseudolites managed by the base station, and transmit a pseudolite array and positioning correction information to the terminal 13.

The pseudolite 12 is configured to generate a random positioning signal sequence based on the identifier information sent from the base station 11, and transmit positioning signal according to the transmission clock and the random positioning signal sequence.

The terminal 13 is configured to generate another random positioning signal sequence of the pseudolite based on the pseudolite array and the positioning correction information sent from the base station 11, perform a match on the received positioning signal according to the another random positioning signal sequence of the pseudolite to determine an arrival time of the positioning signal, and obtain a position coordinate of the terminal through a calculation based on a given position coordinate of the pseudolite and the arrival time of the positioning signal.

Figure 2:
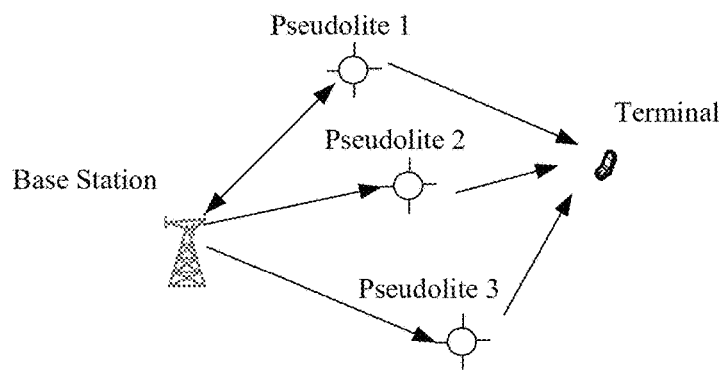
FIG. 2 is a second block diagram illustrating a system of wireless positioning using an in-band pseudolite according to an embodiment of the disclosure.

The system according to an embodiment, as shown in FIG. 2, includes a base station, three pseudolites and a terminal.

In an embodiment, the transmission clocks of the pseudolites managed by the base station may be corrected through following step. The base station may measure a clock difference(s) between itself and one or more pseudolites managed thereby based on synchronization information, and then correct the transmission clock(s) of the one or more pseudolites managed by the base station according to the clock difference(s). Alternatively, the clock difference between the base station and the pseudolite may be measured in other ways. For example, the clock difference may be measured manually and input constantly to a synchronization module of the pseudolite.

In an embodiment, the identifier information includes an identification ID (Identity) of the base station and a pseudolite ID for a pseudolite corresponding thereto. For example, when a base station corresponds to four pseudolites, pseudolites A-D, respectively, the identifier information sent to the pseudolite A may include the ID of the base station and an ID of the pseudolite A.

In an embodiment, the random positioning signal sequence includes a random factor, but is not limited thereto. The random factor may include a base station ID and a pseudolite ID. The random positioning signal sequence may have a sequence length defined by a protocol.

The base station 11 may be further configured to determine whether the terminal managed by it supports function of pseudolite positioning and, if yes, transmit the pseudolite array and the positioning correction information to the terminal supporting the function of pseudolite. Otherwise, the process ends.

The base station 11 may be further configured to negotiate with the terminal 13 via a signaling process and receive a notification, indicative of whether the terminal 13 supports the function of pseudolite positioning, from the terminal 13.

The positioning correction information may include weather information, positioning path correction and other system parameters used for correcting positioning algorithm, but is not limited thereto.

The pseudolite array may include an identifier(s) of one or more pseudolites managed by the base station.

Synchronization and management can be enabled via a synchronization management link between the base station and the pseudolites. Positioning can be realized via a positioning link, which utilizes a same frequency band as a wireless system of the base station, between the pseudolites and the terminal.

The synchronization management link may include enabling visibility condition to be maintained during network construction. Otherwise, if the visibility condition cannot be maintained, synchronization may be performed with pseudolites which have been already synchronized such that visibility condition can be met with at least one of those pseudolites.

Downlink signal over the positioning link of the pseudolite may include only positioning pilot signal sent from the pseudolite.

After successful synchronization of a pseudolite, the synchronization signal may be transmitted to those unpositioned pseudolites via the synchronization link from the pseudolite as configured.

Transmission of the synchronization signal may be implemented through a wired connection or a wireless connection, but is not limited thereto.

Figure 3:
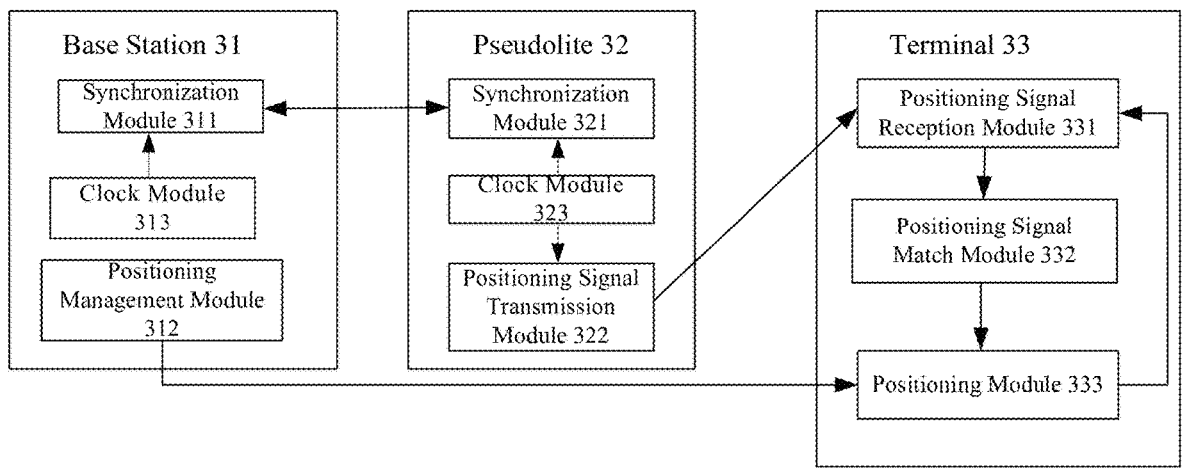
FIG. 3 is a third block diagram illustrating a system of wireless positioning using an in-band pseudolite according to an embodiment of the disclosure.

In an embodiment, as shown in the system illustrated by FIG. 3, the base station 31 according to the embodiment of the disclosure includes a synchronization module 311 and a positioning management module 312.

In an embodiment, the positioning management module 312 is configured to transmit identifier information to the pseudolites and transmit a pseudolite array and positioning correction information to a terminal.

The synchronization module 311 may be configured to correct transmission clocks of multiple pseudolites managed by the base station.

The synchronization module 311 may be further configured to transmit synchronization signal via a synchronization link, measure a clock difference between the base station and an in-band pseudolite, and perform synchronization of transmission clock therebetween.

The base station may also include a clock module 313 configured to provide the synchronization module 311 with a reference clock. Accordingly, the synchronization module 311 may be further configured to transmit the synchronization information through the reference clock, measure a clock difference(s) between the base station and one or more pseudolites managed by it, and correct a transmission clock (s) of the one or more pseudolites managed by the base station according to the clock difference.

The synchronization module 311 may be further configured to transmit the synchronization signal to a pseudolite for measuring a clock difference therebetween, send measurement signal to the in-band pseudolite based on the reference clock, receive response signal from the pseudolite, calculate the clock difference between the base station and the in-band pseudolite, and transmit the clock difference to the pseudolite.

The clock difference may include a time difference between a transmission time point of the synchronization signal from the base station and a reception time point of the synchronization signal at the pseudolite.

The positioning management module 312 may be further configured to transmit the base station ID and the pseudolite ID to a pseudolite positioning signal transmission module, and transmit the pseudolite array as well as the space coordinates of the pseudolite and the base station to the terminal 33.

The synchronization signal may include in-band positioning pilot signal having a random orthogonal sequence with a preset length.

Both the synchronization module 311 and the positioning management module 312 described above can be implemented by hardware such as DSP (Digital Signal Processor), CPU (Central Processing Unit) or the like. The clock module 313 can be implemented by hardware such as a clock, DSP or the like.

In an embodiment, the pseudolite 32 according to an embodiment of the disclosure includes a synchronization module 321 and a positioning signal transmission module 322.

In an embodiment, the synchronization module 321 is configured to control a clock module 323.

The positioning signal transmission module 322 may be configured to generate a random positioning signal sequence based on identifier information sent from the base station 31 and transmit positioning signal according to the transmission clock and the random positioning signal sequence.

The clock module 323 is configured to perform a synchronization of the transmission clock under control of the synchronization module.

The synchronization module 321 is further configured to measure, together with the synchronization module of the base station, a transmission clock difference between the terminal and the pseudolite, and correct a clock of the in-band pseudolite such that synchronization of transmission clocks can be achieved with the base station.

The clock module 323 is further configured to provide a transmission clock of the positioning signal and perform correction based on synchronization result of the synchronization module 321.

In-band positioning signal may be transmitted by the positioning signal transmission module at time and frequency resource as defined by system.

Once the synchronization of the current pseudolite is completed, the synchronization signal can be transmitted from the synchronization module thereof to a synchronization module of another unpositioned pseudolite.

The synchronization module 321 may be further configured to receive synchronization measurement signal sent from the base station 31 and reply with a feedback; and receive a base station reference clock and a pseudolite clock difference as a clock correction.

The clock module 323 may be further configured to correct the transmission clock based on the clock correction from the synchronization module of the pseudolite.

The positioning signal transmission module 322 may be further configured to transmit positioning pilot signal at preset time and preset frequency source based on the clock. In an embodiment, the positioning pilot signal is the only downlink signal to be transmitted.

In an embodiment, when management is performed between the base station and the pseudolite via a wireless link, the transmission module may be also configured to transmit uplink signal for communication with the base station.

The synchronization module 321 may be implemented by hardware such as DSP, CPU or the like. The positioning signal transmission module 322 may be implemented by hardware combination such as an antenna combining DSP or an antenna combining CPU or the like. The clock module may be implemented by a clock.

The terminal 33 according to an embodiment of the disclosure includes a positioning signal reception module 331, a positioning signal match module 332 and a positioning module 333.

In an embodiment, the positioning signal reception module 331 is configured to receive positioning signal.

The positioning signal match module 332 may be configured to generate a random positioning signal sequence of the pseudolite based on the pseudolite array and positioning correction information sent from the base station 31, perform a match on the received positioning signal according to the random positioning signal sequence of the pseudolite 32 to determine an arrival time of the positioning signal.

The positioning module 333 may be configured to obtain a position coordinate of the terminal through a calculation based on a given position coordinate of the pseudolite and the arrival time of the positioning signal.

The positioning signal reception module 331 may be further configured to receive space coordinates of the base station and respective pseudolite, and the pseudolite array to be detected sent from the base station; and receive the positioning signal from respective in-band pseudolite.

The positioning signal match module 332 may be further configured to generate the random positioning signal sequence of the respective pseudolite based on received base station ID and received pseudolite array, perform correlation process on the received positioning signal, and determine an arrival time of an earliest arrival among positioning signal from the respective pseudolite.

The positioning module 333 may be further configured to set a coordinate thereof as (a, x, y, z), wherein a is the clock difference between the terminal and the base station, establish a distance equation based on the given position coordinate of the pseudolite and a distance between the terminal and the pseudolite, and obtain the position coordinate of the terminal by solving the distance equation.

The positioning signal reception module 331 can be implemented by hardware combination such as an antenna combining DSP, an antenna combining CPU or the like. The positioning signal match module 332 and the positioning module 333 may be implemented by hardware such as CPU, DSP or the like.

In an alternative embodiment, when the clock difference between the terminal and the base station can be measured accurately in advance, the parameter a can be omitted, and at least there distance equations of pseudolites are required. If it cannot be measured otherwise, four distance equations of pseudolites are required.

Negotiation with the base station on whether function of in-band pseudolite positioning is supported may be performed as follows. Negotiation may be performed between the base station and the terminal through a signaling process, in which process the terminal can transmit to the base station a token indicative of whether it supports the function of in-band pseudolite positioning, such that the base station can determine thereby whether to transit the pseudolite array to the terminal. Specifically, the base station may transmit the pseudolite array to the terminal only if the terminal supports the function of in-band pseudolite positioning.

The function of in-band pseudolite positioning may be executed by performing wireless positioning only based on the in-band pseudolite(s) or implementing wireless positioning based on combination of the in-band pseudolite(s) and other positioning information from such as a navigation satellite, WiFi™ network, inertial navigation information, cellular network and the like, but is not limited thereto.

Second Embodiment

Figure 4:
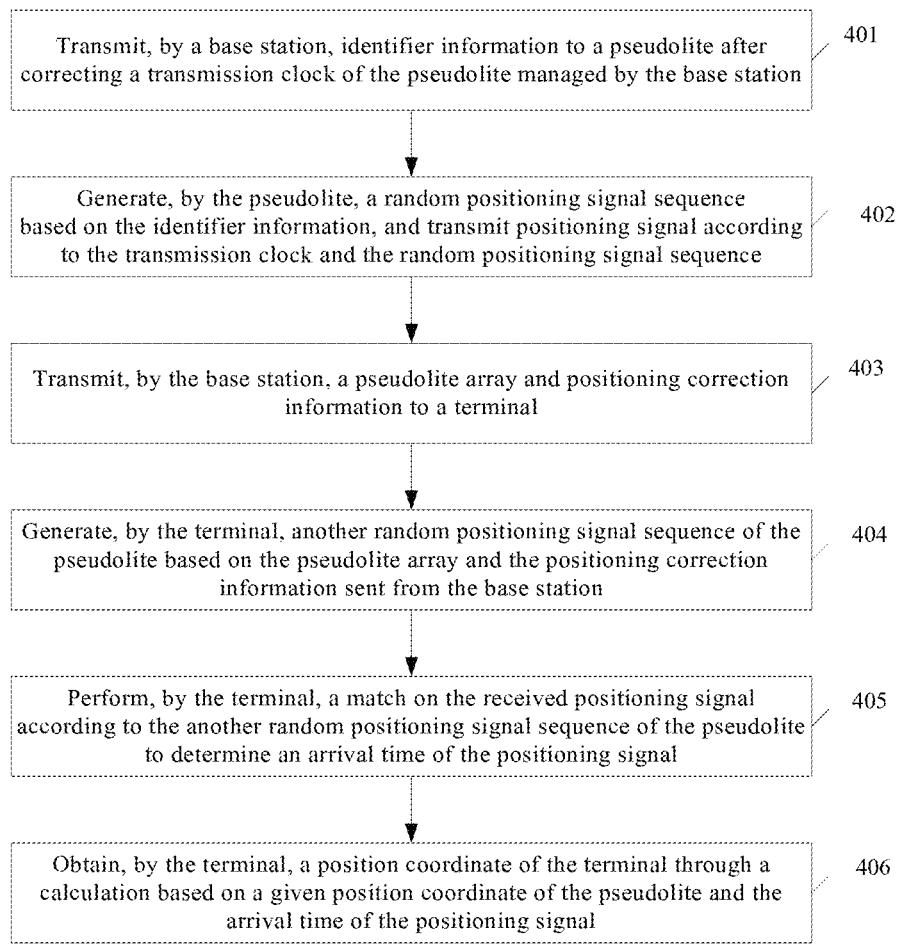
FIG. 4 is a flow chart illustrating a method of wireless positioning using an in-band pseudolite according to an embodiment of the disclosure.

The method of wireless positioning using an in-band pseudolite according to an embodiment of the disclosure, as shown in FIG. 4, includes following steps.

In step 401, identifier information is transmitted by a base station to a pseudolite managed by the base station after correction of a transmission clock is done for the pseudolite.

In an embodiment, the correction of the transmission clock for the pseudolite managed by the base station is performed as follow. The base station may measure a clock difference between the base station and one or more pseudolites managed by the base station based on synchronization information, and correct the transmission clock of the one or more pseudolites managed by the base station according to the clock difference.

Alternatively, the clock difference between the base station and the pseudolite may be measured in other ways. For example, the clock difference may be measured manually and input constantly to a synchronization module of the pseudolite.

In an embodiment, the identifier information includes an ID (Identity) of the base station and a pseudolite ID for a pseudolite corresponding thereto. For example, when a base station corresponds to four pseudolites, pseudolites A-D, respectively, the identifier information sent to the pseudolite A may include the ID of the base station and an ID of the pseudolite A.

In step 402, a random positioning signal sequence is generated by the pseudolite based on the identifier information, and positioning signal is transmitted according to the transmission clock and the random positioning signal sequence.

In an embodiment, the random positioning signal sequence includes a random factor, but is not limited thereto. The random factor may include a base station ID and a pseudolite ID. The random positioning signal sequence may have a sequence length defined by a protocol.

In step 403, a pseudolite array and positioning correction information are transmitted by the base station to a terminal.

In an embodiment, the base station determines whether the terminal managed by it supports function of pseudolite positioning and, if yes, transmit the pseudolite array and the positioning correction information to the terminal supporting the function of pseudolite. Otherwise, the process ends.

In an embodiment, whether the terminal managed by the base station supports the function of pseudolite positioning is determined, but not limited thereto, through negotiation between the base station and the terminal via a signaling process, in which process the terminal may send a token, indicative of whether it supports the function of pseudolite positioning, to the base station.

In an embodiment, the positioning correction information may include, but is not limited to, weather information, positioning path correction and other system parameters used for correcting positioning algorithm.

The pseudolite array may include an identifier(s) of one or more pseudolites managed by the base station.

Steps 402 and 403 described above may be performed in any order.

In step 404, another random positioning signal sequence of the pseudolite is generated by the terminal based on the pseudolite array and the positioning correction information sent from the base station.

In step 405, a match is performed by the terminal on the received positioning signal according to the another random positioning signal sequence of the pseudolite to determine an arrival time of the positioning signal.

In step 406, a position coordinate of the terminal is obtained by itself through a calculation based on a given position coordinate of the pseudolite and the arrival time of the positioning signal.

The position coordinate of the terminal may be obtained through following calculation. A calculation equation of the position coordinate may be established based on the given position coordinate of the pseudolite and the arrival time of the positioning signal, and the position coordinate of the terminal, as well as a clock difference between the terminal and a corresponding base station, may be then obtained through the calculation equation.

Third Embodiment

An operation process of the base station in the method of wireless positioning using an in-band pseudolite provided according to an embodiment of the disclosure may include following step.

Identifier information is transmitted after correction of a transmission clock for a pseudolite managed by the base station; and a pseudolite array and positioning correction information are transmitted by the base station.

In an embodiment, the correction of the transmission clock for the pseudolite managed by the base station is performed as follow. The base station may measure a clock difference between the base station and one or more pseudolites managed by the base station based on synchronization information, and correct the transmission clock of the one or more pseudolites managed by the base station according to the clock difference.

The identifier information may include an ID of the base station and a pseudolite ID for a pseudolite corresponding thereto.

In an embodiment, the pseudolite array and the positioning correction information are transmitted by the base station through following steps. The base station may determine whether the terminal managed by itself supports function of pseudolite positioning and, if yes, transmit the pseudolite array and the positioning correction information. Otherwise, the process ends.

Fourth Embodiment

An operation process of the pseudolite in the method of wireless positioning using an in-band pseudolite provided according to an embodiment of the disclosure may include following step. A random positioning signal sequence may be generated by a pseudolite based on identifier information, and positioning signal may be transmitted according to a transmission clock and the random positioning signal sequence.

In an embodiment, the random positioning signal sequence includes, but is not limited to, a random factor which may include a base station ID and a pseudolite ID and have a sequence length defined by a protocol.

Fifth Embodiment

An operation process of the terminal in the method of wireless positioning using an in-band pseudolite provided according to an embodiment of the disclosure may include following step.

A random positioning signal sequence of a pseudolite may be generated by the terminal based on a pseudolite array and positioning correction information.

A match may be then performed by the terminal on received positioning signal according to the random positioning signal sequence of the pseudolite, so as to determine an arrival time of the positioning signal.

A position coordinate of the terminal may be thus obtained by itself through a calculation based on a given position coordinate of the pseudolite and the arrival time of the positioning signal.

In an embodiment, the position coordinate of the terminal may be obtained through following calculation. A calculation equation of the position coordinate may be established based on the given position coordinate of the pseudolite and the arrival time of the positioning signal, and the position coordinate of the terminal, as well as a clock difference between the terminal and a corresponding base station, may be then obtained through the calculation equation.

Sixth Embodiment

Figure 5:
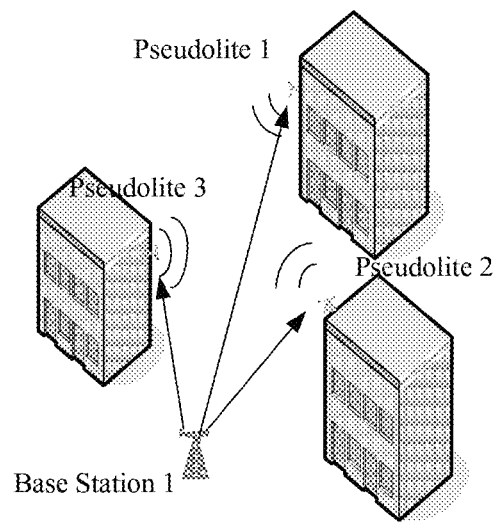
FIG. 5 is a block diagram illustrating a system of inter-buildings wireless positioning using an in-band pseudolite according to an embodiment of the disclosure.

A system of inter-buildings wireless positioning using an in-band pseudolite according to an embodiment of the disclosure, as shown in FIG. 5, is provided with 1 base station and 3 in-band pseudolites among buildings.

In the embodiment, the 3 in-band pseudolites are managed by the base station which provides a synchronization reference clock. In addition to transmission of general downlink signal, the base station is also configured to transmit the positioning signal at a preset power. The 3 in-band pseudolites are configured to transmit downlink positioning signal according to a preset power. An exemplary implementation may be performed as follow.

In step 501, synchronization signal is transmitted from the base station 1 to the pseudolite 1, 2 and 3, respectively, via a wireless management link, such that clock differences between the base station 1 and respective one of the 3 in-band pseudolites can be measured. Local transmission clocks may be then adjusted by the 3 in-band pseudolites, respectively, based on the clock differences, such that transmission timepoints of wireless positioning signal from the 3 in-band pseudolites and the base station can be synchronized.

In step 502, the base station transmits the base station ID and a pseudolite ID 1 to the pseudolite 1, the base station ID and a pseudolite ID 2 to the pseudolite 2, and the base station ID and a pseudolite ID 3 to the pseudolite 3.

In step 503, a random positioning signal sequence 0 is generated by the base station based on the base station ID and a pseudolite ID 0; a random positioning signal sequence 1 is generated by the pseudolite 1 based on the base station ID and the pseudolite ID 1; a random positioning signal sequence 2 is generated by the pseudolite 2 based on the base station ID and the pseudolite ID 2; and a random positioning signal sequence 3 is generated by the pseudolite 3 based on the base station ID and the pseudolite ID 3.

In step 504, the in-band random positioning signal sequence 0 is transmitted by the base station according to the reference clock; the in-band random positioning signal sequence 1 is transmitted by the pseudolite 1 according to its local transmission clock that was adjusted; the in-band random positioning signal sequence 2 is transmitted by the pseudolite 2 according to its local transmission clock that was adjusted; and the in-band random positioning signal sequence 3 is transmitted by the pseudolite 3 according to its local transmission clock that was adjusted.

In step 505, the pseudolite array {pseudolite ID 0, pseudolite ID 1, pseudolite ID 2, pseudolite ID 3} is transmitted by the base station to the terminal to be positioned.

In step 506, the random positioning signal sequences 1-4 are respectively generated by the terminal, such that a correlation match can be performed on its received in-band positioning signal, and arrival time of the earliest arrival for four sources of positioning signal can be thus measured as for example T1, T2, T3 and T4.

In step 507, equations are established by the terminal based on given position coordinates of the pseudolites and the arrival time.

Assuming that the position coordinate of the terminal is (x, y, z), the clock difference between the terminal and the base station is $\alpha$, then at least 3 pseudolite equations are required if a is measured in advance between the terminal and the base station.

In step 508, the space position coordinate of the terminal is obtained by solving the equations.

Seventh Embodiment

Figure 6:
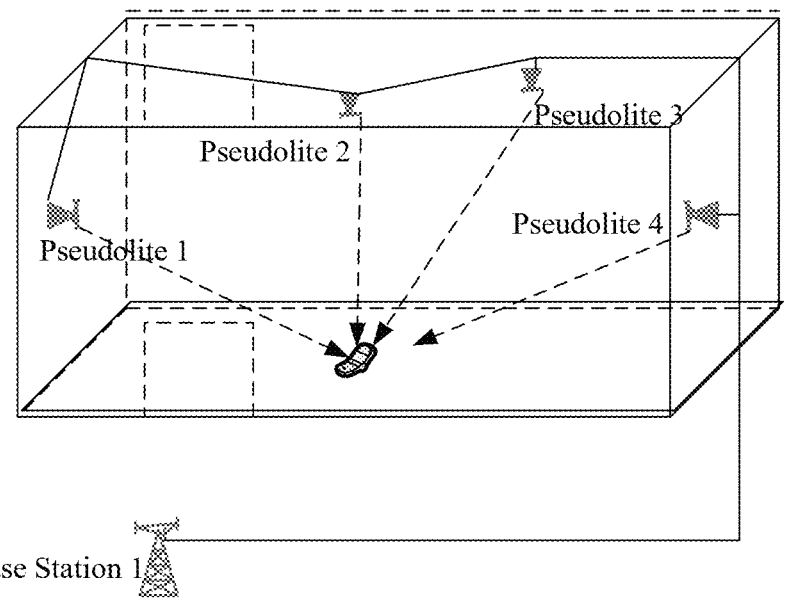
FIG. 6 is a block diagram illustrating a system of indoor wireless positioning using an in-band pseudolite according to an embodiment of the disclosure.

A system of wireless positioning using an in-band pseudolite according to an embodiment of the disclosure, as shown in FIG. 6, is provided with 4 in-band pseudolites indoor and 1 reference base station outdoor.

The 4 in-band pseudolites are managed by the base station which provides a synchronization reference clock via a wired connection. The 4 in-band pseudolites are configured to transmit downlink positioning signal according to a preset power. An exemplary implementation may be performed as follow.

In a first step, synchronization signal is transmitted from the base station 1 to the pseudolite 1, 2, 3 and 4, respectively, via a wired management link, such that clock differences between the base station 1 and respective one of the 4 in-band pseudolites can be measured. Local transmission clocks may be then adjusted by the 4 in-band pseudolites, respectively, based on the clock differences, such that transmission timepoints of wireless positioning signal from the 4 in-band pseudolites and the base station can be synchronized.

In a second step, the base station transmits the base station ID and a pseudolite ID 1 to the pseudolite 1, the base station ID and a pseudolite ID 2 to the pseudolite 2, the base station ID and a pseudolite ID 3 to the pseudolite 3, and the base station ID and a pseudolite ID 4 to the pseudolite 4.\

In a third step, a random positioning signal sequence 1 is generated by the pseudolite 1 based on the base station ID and the pseudolite ID 1; a random positioning signal sequence 2 is generated by the pseudolite 2 based on the base station ID and the pseudolite ID 2; a random positioning signal sequence 3 is generated by the pseudolite 3 based on the base station ID and the pseudolite ID 3; and a random positioning signal sequence 4 is generated by the pseudolite 4 based on the base station ID and the pseudolite ID 4.

In a fourth step, the in-band random positioning signal sequence 1 is transmitted by the pseudolite 1 according to its local transmission clock that was adjusted; the in-band random positioning signal sequence 2 is transmitted by the pseudolite 2 according to its local transmission clock that was adjusted; the in-band random positioning signal sequence 3 is transmitted by the pseudolite 3 according to its local transmission clock that was adjusted; the in-band random positioning signal sequence 4 is transmitted by the pseudolite 4 according to its local transmission clock that was adjusted.

In a fifth step, the pseudolite array {pseudolite ID 0, pseudolite ID 1, pseudolite ID 2, pseudolite ID 3, pseudolite ID 4} is transmitted by the base station to the terminal to be positioned.

In a sixth step, the random positioning signal sequences 1-4 are respectively generated by the terminal, such that a correlation match can be performed on its received in-band positioning signal, and arrival time of the earliest arrival for four sources of positioning signal can be thus measured as for example T1, T2, T3 and T4.

In a seventh step, equations are established by the terminal based on given position coordinates of the pseudolites and the arrival time. Assuming that the position coordinate of the terminal is (x, y, z), the clock difference between the terminal and the base station is $\alpha$, then at least 3 pseudolite equations are required if $\alpha$ is measured in advance between the terminal and the base station.

In an eighth step, the space position coordinate of the terminal is obtained by solving the equations.

Eighth Embodiment

Figure 7:
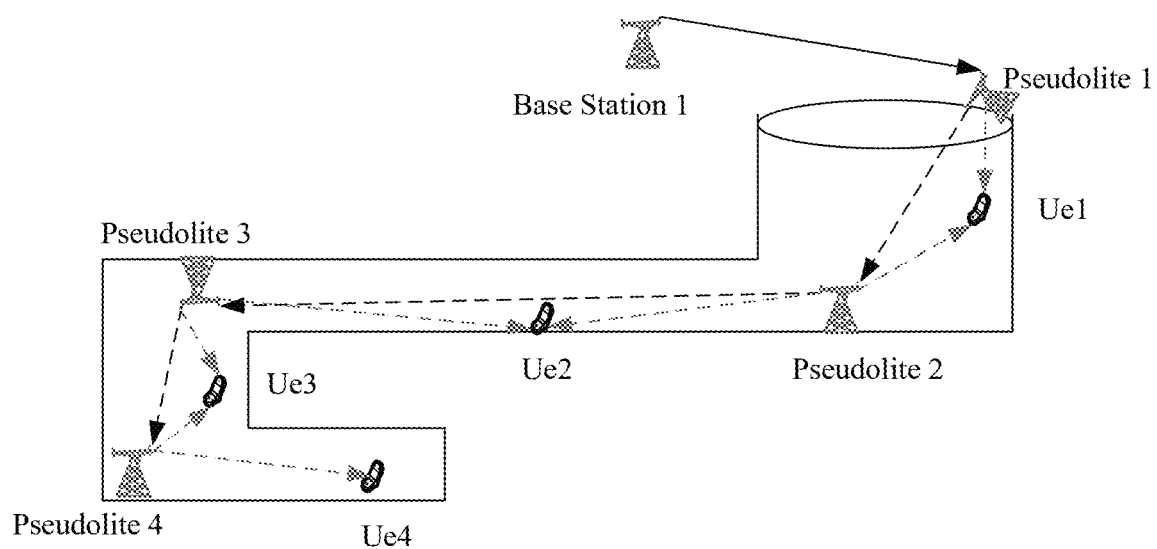
FIG. 7 is a block diagram illustrating a system of mine wireless positioning using an in-band pseudolite according to an embodiment of the disclosure.

A system of mine wireless positioning using an in-band pseudolite according to an embodiment of the disclosure, as shown in FIG. 7, is provided with 4 in-band pseudolites inside the mine and 1 reference base station outside the mine. The 4 in-band pseudolites are managed by the base station which provides a synchronization reference clock via a wireless connection. The 4 in-band pseudolites are configured to transmit downlink positioning signal according to a preset power. An exemplary implementation may be performed as follow.

1) Synchronization signal is transmitted from the base station 1 to the pseudolite 1 via a wireless management link, such that a clock difference between the base station 1 and the pseudolite 1 can be measured. After completion of synchronization for the pseudolite 1, synchronization signal is transmitted by the pseudolite 1 to the pseudolite 2 via a wireless connection, such that a clock difference between the pseudolites 1 and 2 can be measured. After completion of synchronization for the pseudolite 2, synchronization signal is transmitted by the pseudolite 2 to the pseudolite 3 via a wireless connection, such that a clock difference between the pseudolites 2 and 3 can be measured. After completion of synchronization for the pseudolite 3, synchronization signal is transmitted by the pseudolite 3 to the pseudolite 4 via a wireless connection, such that a clock difference between the pseudolites 3 and 4 can be measured. Local transmission clocks may be then adjusted by the 4 in-band pseudolites, respectively, based on the clock differences, such that transmission timepoints of wireless positioning signal from the 4 in-band pseudolites and the base station can be synchronized.

2) The base station transmits the base station ID and a pseudolite ID 1 to the pseudolite 1, the base station ID and a pseudolite ID 2 to the pseudolite 2, the base station ID and a pseudolite ID 3 to the pseudolite 3, and the base station ID and a pseudolite ID 4 to the pseudolite 4.

3) A random positioning signal sequence 1 is generated by the pseudolite 1 based on the base station ID and the pseudolite ID 1; a random positioning signal sequence 2 is generated by the pseudolite 2 based on the base station ID and the pseudolite ID 2; a random positioning signal sequence 3 is generated by the pseudolite 3 based on the base station ID and the pseudolite ID 3; and a random positioning signal sequence 4 is generated by the pseudolite 4 based on the base station ID and the pseudolite ID 4.

4) The in-band random positioning signal sequence 1 is transmitted by the pseudolite 1 according to its local transmission clock that was adjusted; the in-band random positioning signal sequence 2 is transmitted by the pseudolite 2 according to its local transmission clock that was adjusted; the in-band random positioning signal sequence 3 is transmitted by the pseudolite 3 according to its local transmission clock that was adjusted; the in-band random positioning signal sequence 4 is transmitted by the pseudolite 4 according to its local transmission clock that was adjusted.

5) The pseudolite array {pseudolite ID 0, pseudolite ID 1, pseudolite ID 2, pseudolite ID 3, pseudolite ID 4} is transmitted by the base station to the terminals 1, 2, 3, 4 which are to be positioned.

6) The random positioning signal sequences 1-4 are generated by each of the terminals 1, 2, 3 and 4, and a correlation match can be then performed on their received in-band positioning signal, respectively.

Arrival time of the earliest arrival for positioning signal from the pseudolites 1 and 2 may be thus measured by the terminal 1 as for example T11, T12.

Arrival time of the earliest arrival for positioning signal from the pseudolites 2 and 3 may be thus measured by the terminal 2 as for example T22, T23.

Arrival time of the earliest arrival for positioning signal from the pseudolites 3 and 4 may be thus measured by the terminal 3 as for example T33, T34.

\Arrival time of the earliest arrival for positioning signal from the pseudolites 4 may be thus measured by the terminal 4 as for example T44.

7) Equations are established by the terminals 1, 2, 3 and 4, respectively, based on given position coordinates of the pseudolites and the arrival time.

In an embodiment, a map of the mine may be known in advance, such that the number of pseudolites as required can be reduced by using the map. Assuming that the terminals are able to keep in synchronization with the base station, following can be realized.

Two-dimensional coordinates on a vertical plane may be obtained by the terminal 1 through two distance equations of the pseudolites 1 and 2.

Two-dimensional coordinates on a vertical plane may be obtained by the terminal 2 through two distance equations of the pseudolites 2 and 3.

Two-dimensional coordinates on a vertical plane may be obtained by the terminal 3 through two distance equations of the pseudolites 3 and 4.

One-dimensional coordinate on a paved path may be obtained by the terminal 4 through one distance equation of the pseudolite 4.

Described above are only embodiments of the disclosure, but not to limit protection scope thereof.

What is claimed is:

1. A system of wireless positioning using in-band pseudolites, comprising a base station, the multiple pseudolites similar to navigation satellites setting at low altitude and being able to transmit same signal as that of the navigation satellites, and a terminal; wherein the base station includes a clock module and a synchronization module, the clock module is configured to provide the synchronization module with a synchronization clock, and the synchronization module is configured to generate synchronization information based on the synchronization clock provided by the clock module, the base station is configured to correct transmission clocks of the pseudolites managed by the base station by measuring by the base station a clock difference between the base station and each of the multiple pseudolites managed by the base station based on synchronization information and correcting the transmission clock of the multiple pseudolites managed by the base station according to the clock difference, and transmit identifier information to the pseudolites, and transmit identifiers of the pseudolites, coordinates of the pseudolites and positioning correction information to the terminal, wherein the identifiers of the pseudolites comprises identifiers of the pseudolites managed by the base station;

each of the pseudolites is configured to generate a random positioning signal sequence based on the identifier information, and transmit a positioning signal, according to the transmission clock and the random positioning signal sequence, via a positioning link having a same frequency band as a wireless system of the base station, wherein the transmission clock is adjusted by the system and the corresponding positioning correction information is transmitted to the terminal by the base station, and the random positioning signal sequence comprises a random factor, the random factor comprising a base station ID and a pseudolite ID; and the terminal receives position coordinates of the pseudolites, the identifiers of the pseudolites, the positioning correction information, and positioning signals being transmitted by the multiple pseudolites via a positioning link having a same frequency band as a wireless system of the base station according to the identifier information, the terminal is configured to generate another random positioning signal sequence of the pseudolites based on the identifiers of the pseudolites and the positioning correction information, perform a match on positioning signals received from the pseudolites with the another random positioning signal sequence of the pseudolites to determine arrival times of the positioning signals, and obtain a position coordinate of the terminal through a calculation based on position coordinates of the pseudolites and the arrival time of the positioning signals.

2. A method of wireless positioning using in-band pseudolites, comprising:

correcting, by a base station, a-transmission clocks of pseudolites managed by the base station, wherein the base station includes a clock module and a synchronization module, the clock module is configured to provide the synchronization module with a synchronization clock, and the synchronization module is configured to generate synchronization information based on the synchronization clock provided by the clock module;

transmitting, by the base station, identifier information to the pseudolites similar to navigation satellites setting at low altitude and being able to transmit same signal as that of the navigation satellites;

generating, by each of the pseudolites, a random positioning signal sequence based on the identifier information, and transmitting a positioning signal according to the transmission clock and the random positioning signal sequence, wherein the transmission clock is adjust by the system and the corresponding positioning correction information is transmitted to the terminal by the base station, and the random positioning signal sequence comprises a random factor, the random factor comprising a base station ID and a pseudolite ID;

transmitting, by the base station, identifiers of the pseudolites, coordinates of the pseudolites and positioning correction information to a terminal, wherein the identifiers of the pseudolites comprises identifiers of one or more pseudolites managed by the base station, such that the terminal receives position coordinates of the pseudolites, identifiers of the pseudolites, the positioning correction information, and positioning signals being transmitted by the multiple pseudolites via a positioning link having a same frequency band as a wireless system of the base station according to the identifier information;

generating, by the terminal, another random positioning signal sequence of the pseudolites based on the identifiers of the pseudolites and the positioning correction information sent from the base station;

performing, by the terminal, a match on positioning signal received from the pseudolites with the another random positioning signal sequence of the pseudolites to determine arrival times of the positioning signals; and obtaining, by the terminal, a position coordinate of the terminal through a calculation based on position coordinates of the pseudolites and the arrival times of the positioning signals.

3. The method as claimed in claim 2, wherein the identifier information comprises an identification ID of the base station and a pseudolite ID for a pseudolite corresponding to the pseudolite ID.

4. The method as claimed in claim 3, wherein the transmitting by the base station identifiers of the pseudolites and positioning correction information to a terminal comprises:

determining whether the terminal managed by the base station supports a function of pseudolite positioning;

if yes, transmitting by the base station the identifiers of the pseudolites and positioning correction information; and if no, ending process.

5. The method as claimed in claim 2, wherein the random positioning signal sequence comprises a random factor, the random factor comprising a base station ID and a pseudolite ID; and wherein the random positioning signal sequence has a sequence length defined by a protocol.

* * * * *